United States Patent
Gupta et al.

(10) Patent No.: US 11,880,373 B2
(45) Date of Patent: Jan. 23, 2024

(54) SYSTEMS AND METHODS FOR IDENTIFYING A CATEGORY OF A SEARCH TERM AND PROVIDING SEARCH RESULTS SUBJECT TO THE IDENTIFIED CATEGORY

(71) Applicant: Rovi Product Corporation, San Jose, CA (US)

(72) Inventors: Prabhat Gupta, Uttar Pradesh (IN); Manik Malhotra, New Delhi (IN)

(73) Assignee: Rovi Product Corporation, San Jose, CA (US)

( * ) Notice: Subject to any disclaimer, the term of this patent is extended or adjusted under 35 U.S.C. 154(b) by 338 days.

(21) Appl. No.: 17/400,283

(22) Filed: Aug. 12, 2021

(65) Prior Publication Data
US 2021/0374148 A1    Dec. 2, 2021

Related U.S. Application Data

(63) Continuation of application No. 15/696,605, filed on Sep. 6, 2017, now Pat. No. 11,120,027.

(51) Int. Cl.
*G06F 16/2457* (2019.01)
*G06F 16/248* (2019.01)
*G06F 16/9535* (2019.01)
*G06F 16/78* (2019.01)

(52) U.S. Cl.
CPC ...... *G06F 16/24575* (2019.01); *G06F 16/248* (2019.01); *G06F 16/7867* (2019.01); *G06F 16/9535* (2019.01)

(58) Field of Classification Search
None
See application file for complete search history.

(56) References Cited

U.S. PATENT DOCUMENTS

| | | | |
|---|---|---|---|
| 6,239,794 B1 | 5/2001 | Yuen et al. | |
| 6,564,378 B1 | 5/2003 | Satterfield et al. | |
| 7,165,098 B1 | 1/2007 | Boyer et al. | |
| 7,761,892 B2 | 7/2010 | Ellis et al. | |
| 8,046,801 B2 | 10/2011 | Ellis et al. | |
| 8,612,450 B1 | 12/2013 | Proffit et al. | |
| 8,849,830 B1 * | 9/2014 | Srinivasan | G06F 16/951 707/740 |
| 2002/0174430 A1 | 11/2002 | Ellis et al. | |
| 2005/0251827 A1 | 11/2005 | Ellis et al. | |
| 2006/0101041 A1 | 5/2006 | Agarwal et al. | |
| 2007/0005639 A1 * | 1/2007 | Gaussier | G06F 16/48 |
| 2007/0073734 A1 * | 3/2007 | Doan | G06F 16/83 707/E17.127 |

(Continued)

OTHER PUBLICATIONS

Greemwald, "How to automatically Tag Your Movies with Useful Metadata", Will Greemwald, May 14, 2010.

*Primary Examiner* — Augustine K. Obisesan
(74) *Attorney, Agent, or Firm* — Lerner David LLP

(57) ABSTRACT

Systems and methods are disclosed herein for identifying a category of a search term and providing search results subject to the identified category. These systems and methods may be performed by a media guidance application. The media guidance application may receive a search term that may correspond to different categories of items, and the media guidance application may identify a category that the search term is most likely related to using a hierarchical structure. The media guidance application may limit the search to the identified category of items.

20 Claims, 9 Drawing Sheets

(56) References Cited

U.S. PATENT DOCUMENTS

| | | | |
|---|---|---|---|
| 2007/0239741 A1 | 10/2007 | Jordahl | |
| 2007/0294200 A1 | 12/2007 | Au | |
| 2010/0070339 A1* | 3/2010 | Bae | G06Q 30/02 |
| | | | 705/7.11 |
| 2010/0076979 A1* | 3/2010 | Wang | G06F 16/245 |
| | | | 707/E17.014 |
| 2010/0153885 A1 | 6/2010 | Yates | |
| 2011/0029517 A1* | 2/2011 | Ji | G06F 16/951 |
| | | | 706/45 |
| 2012/0005148 A1* | 1/2012 | Horvitz | G06N 20/00 |
| | | | 706/50 |
| 2015/0046464 A1* | 2/2015 | Raiber | G06F 16/2246 |
| | | | 707/741 |
| 2015/0186515 A1 | 7/2015 | Rao et al. | |
| 2015/0263984 A1 | 9/2015 | Benton et al. | |
| 2017/0004206 A1* | 1/2017 | Boland | G06F 16/9024 |
| 2018/0113938 A1 | 4/2018 | Piramuthu et al. | |

* cited by examiner

SYSTEMS AND METHODS FOR IDENTIFYING A CATEGORY OF A SEARCH TERM AND PROVIDING SEARCH RESULTS SUBJECT TO THE IDENTIFIED CATEGORY

CROSS-REFERENCE TO RELATED APPLICATION

This application is a continuation of U.S. patent application Ser. No. 15/696,605, filed Sep. 6, 2017, the disclosure of which is hereby incorporated by reference herein in its entirety.

BACKGROUND

In currently available systems, an online resource such as webpage may be used as a source for information relating to media content. For example, an existing system may form a search query based on a search term "Star Wars" and receive search results for the term. However, currently available systems are not effective at determining context of the query just based on the search term. For example, the webpage entitled "Star Wars" may be related to the movie "Star Wars," the television series "Star Wars," the novel "Star Wars," the soundtrack of the movie "Star Wars," any commentary article relating to "Star Wars," and/or the like. If the search query for "Star Wars" was intended for the television series "Star Wars," search results including content describing the movie "Star Wars" may be undesirable.

SUMMARY

Systems and methods are disclosed herein for identifying a category of a search term and providing search results subject to the identified category. These systems and methods may be performed by a media guidance application. For example, the media guidance application may receive a search term that may correspond to different categories of items, and the media guidance application may identify a category that the search term is most likely related to. The media guidance application may limit the search to the identified category of items.

The media guidance application may transmit a search query based on the search term to a database that stores structured files for a plurality of search terms. The media guidance application may receive, in response to the query, a structured data file corresponding to the search term. For example, the structured data file may include a Wikipedia webpage or another suitable webpage directed to the search term. The structured data file may include a plurality of previously stored tags, and each tag may describe a subcategory relating to the content of the structured data file. For example, a webpage in response to the search term "Star Wars" may include tags such as "$20^{th}$ century fox films," "science fiction by franchise," "Disney franchise," "space opera," "wars in fiction," "works set in fictional galaxies," etc.

The media guidance application may retrieve a pre-defined hierarchical structure describing a hierarchy of multiple levels of a plurality of subcategories. The pre-defined hierarchical structure may include a plurality of seed nodes, each seed node corresponding to a category that the search term may belong to, e.g., movie, television series, novel, soundtrack, or another suitable category. The pre-defined hierarchical structure may have a plurality of lower-level nodes, each lower-level node corresponding to a subcategory that may match with one or more tags from the structured data file. For example, the pre-defined hierarchical structure may have a node at one of the lower-levels under the seed node level, corresponding to a subcategory of "$20^{th}$ century fox films," which matches one of the tags of the webpage describing "Star Wars."

The media guidance application may use the pre-defined hierarchical structure to determine a number of probability values, each of which indicative of a likelihood that the search term belongs to a category represented by a respective seed node. For example, the media guidance application may search, in the pre-defined hierarchical structure, for a respective node corresponding to a subcategory, e.g., "$20^{th}$ century fox films," described by each respective tag from the plurality of tags. In some embodiments, to locate the respective node, the media guidance application may traverse the pre-defined hierarchical structure using a breadth-first search procedure. For example, for each traversed node, the media guidance application may determine whether the subcategory corresponding to the node matches the subcategory described by the respective tag. In response to determining that the subcategory corresponding to the node matches the subcategory described by the tag, the media guidance application may identify the respective node as the node representing the respective tag, e.g., "$20^{th}$ century fox films." The media guidance application may repeat the traversing for every tag, and may locate a node in the pre-defined hierarchical structure that corresponds to each tag, e.g., a node corresponding to each of "science fiction by franchise," "Disney franchise," "space opera," "wars in fiction," "works set in fictional galaxies," or another suitable tag.

In response to locating the respective node corresponding to the subcategory described by the respective tag, e.g., "$20^{th}$ century fox films," the media guidance application may determine, within the pre-defined hierarchical structure, a path from the seed node to the node. For example, a node that matches with "$20^{th}$ century fox films" may be found in the pre-defined hierarchical structure along the path "$20^{th}$ Century Fox films→American films by studio→American films→movies by country→movies," which is connected to the seed node "movies." The media guidance application may calculate the length for the path connecting the respective node corresponding to the respective tag "$20^{th}$ century fox films" with the seed node "movies," by counting the number of edges along the path, e.g., four in this example.

In some embodiments, in response to determining that no node in the pre-defined hierarchical structure matches the subcategory described by a respective tag, the media guidance application may allocate a pre-defined path length to denote a distance between the respective tag and the seed node. The pre-defined path length is selected to be a value that approximate infinity, e.g., 10000, 50000, etc.

In some embodiments, to calculate a probability value indicative of a likelihood that the search term (e.g., "Star Wars") belongs to a category represented by a respective seed node (e.g., movies), the media guidance application may designate a unit vector to each seed node, and then determine a respective tag vector corresponding to a respective tag by taking a weighted sum of all unit vectors. Each of the unit vectors may be weighted by the length of the path connecting the node representing the tag and the respective seed node. For example, in the tag vector for "$20^{th}$ century fox films," the unit vector designated to the seed node "movies" is weighted by the length of four.

The media guidance application may determine a document vector by summing all tag vectors for the plurality of tags. The media guidance application may calculate a probability value by normalizing a coefficient corresponding to a respective unit vector in the document vector. The probability value may indicate the probability that the structured data file belongs to the respective category corresponding to the respective unit vector. For example, the media guidance application may calculate a probability of 0.46 that the webpage describing "Star Wars" relates to the category of "movies," and a probability of 0.26 that the webpage relates to the category of "television." The media guidance application may compare the probability values, and determine a category corresponding to the seed node with the highest probability, and perform a search subject to the category based on the search term. For example, the media guidance application may determine that the category "movies" has the highest probability value of 0.46 among all categories, and may search for "Star Wars" in a database of movies.

It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Systems and methods are disclosed herein for identifying a category of a search term and providing search results subject to the identified category. For example, a search term, e.g., "Star Wars," may relate to different categories of objects (e.g., the "Star War" movie, the "Star Wars" television series, the "Star Wars" novel, the "Star Wars" soundtrack, or another suitable category. A search system may not be able to identify which type of objects the search term is intended for. A media guidance application, implemented, at least partially on a user equipment device, may be used to receive the search term (e.g., "Star Wars") and determine whether the search term is indicative of a first category (e.g., movies) or a second category (e.g., television series), or other categories, as a search based on the search term is performed. Thus, the media guidance application may automatically perform the search based on the search term subject to a determined category, and, as a result, exclude undesirable items from the list of search results. The exclusion-by-category mechanism may improve accuracy of the search process, and may also reduce the burden on the user or the system originating the search request by not including unwanted or unintended search results, which may improve user experience and/or system efficiency of the search process.

Figure 1:
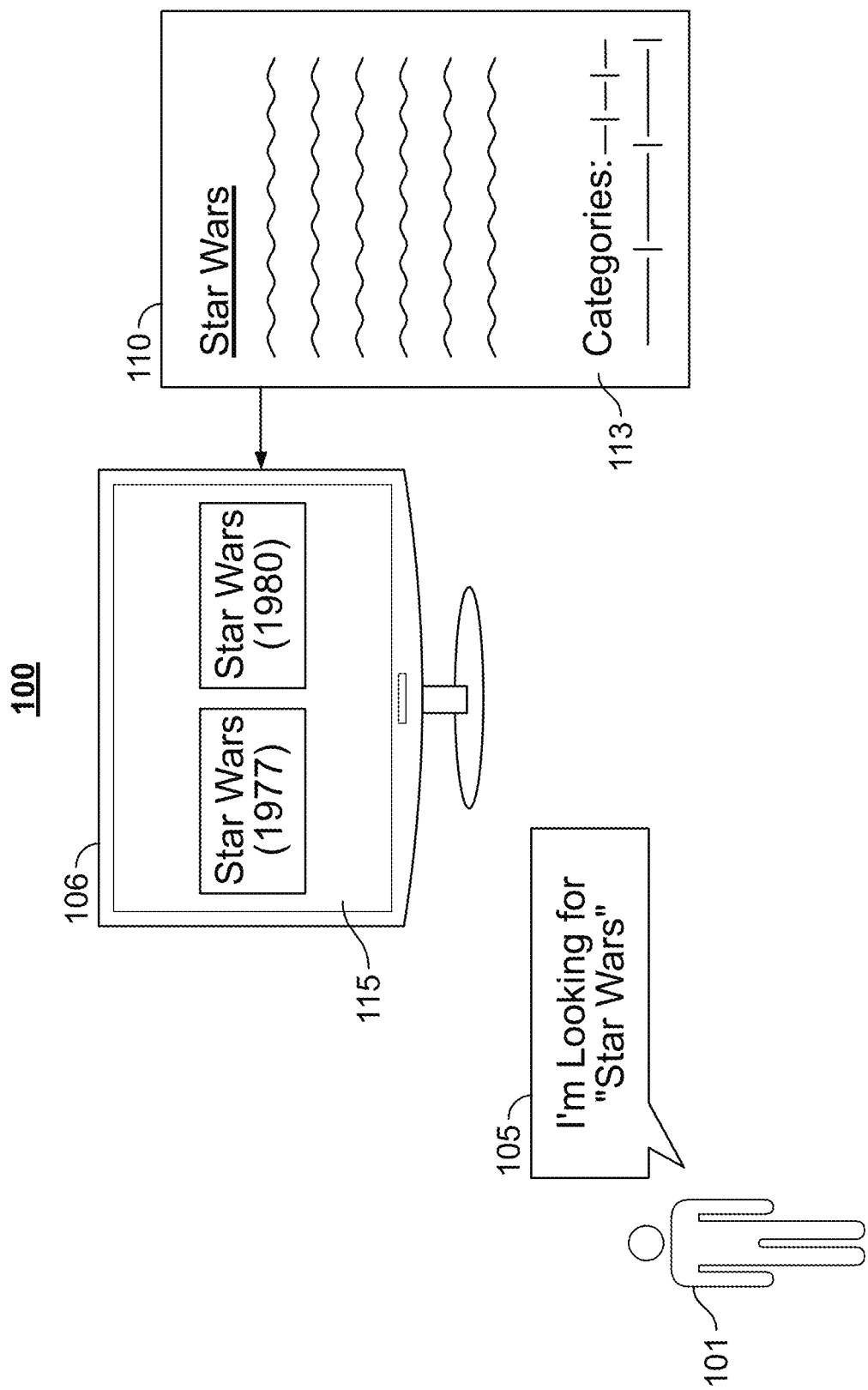
FIG. 1 depicts an illustrative diagram for identifying a category of a search term and providing search results subject to the identified category, in accordance with some embodiments of the disclosure.

In some embodiments, the media guidance application may use the following actions to identify a category of a search term and provide search results subject to the identified category. Specifically, the media guidance application, may receive a search term. For example, the media guidance application may receive a search term from a user via an input device (e.g., 510 in FIG. 5), or a communication interface (e.g., I/O path 502 in FIG. 5). As illustrated in FIG. 1, a user 101 may submit a search request 105, e.g., "I am looking for 'Star Wars'" to user equipment 106. For example, a media guidance application may receive the search request 106 that includes a search term in the form of a voice command, a textual input, or another suitable input, via an Input/Output (I/O) path 502 as described in relation to FIG. 5. The media guidance application may be implemented at a set-top box with the user equipment 106, which may receive the search request 105 and identify a search term of "Star Wars."

The media guidance application may transmit a search query to a server. Specifically, the media guidance application may transmit, to a database that stores structured files for a plurality of search terms, a query that includes the search term. For example, the media guidance application may form and transmit a search query based on the search term "Star Wars" to a database (e.g., at storage 508 as described in relation to FIG. 5, or data source 618 as described in relation to FIG. 6) that stores structured files for a plurality of search terms.

The media guidance application may use a database file to determine an intended category for the received search term using pre-stored documents related to the search term, such as but not limited to database files, webpages, knowledge graphs. Specifically, the media guidance application may receive, in response to the query, a structured data file corresponding to the search term. For example, the media guidance application may receive a structured data file 110 corresponding to the search term "Star Wars," e.g., a Wikipedia webpage directed to "Star Wars," a previously stored document entitled "Star Wars," and/or the like. The structured data file 110, e.g., the Wikipedia webpage for "Star Wars," may include a plurality of previously stored tags, e.g., as shown at 113, such as "20$^{th}$ century fox films," "Disney franchise," "science fiction by franchise," "space opera," "wars in fiction," "works set in fictional galaxies," and/or the like. Each tag of the plurality of tags may describe a subcategory relating to the content of the structured data file (e.g., structured data file 110).

Figure 2:
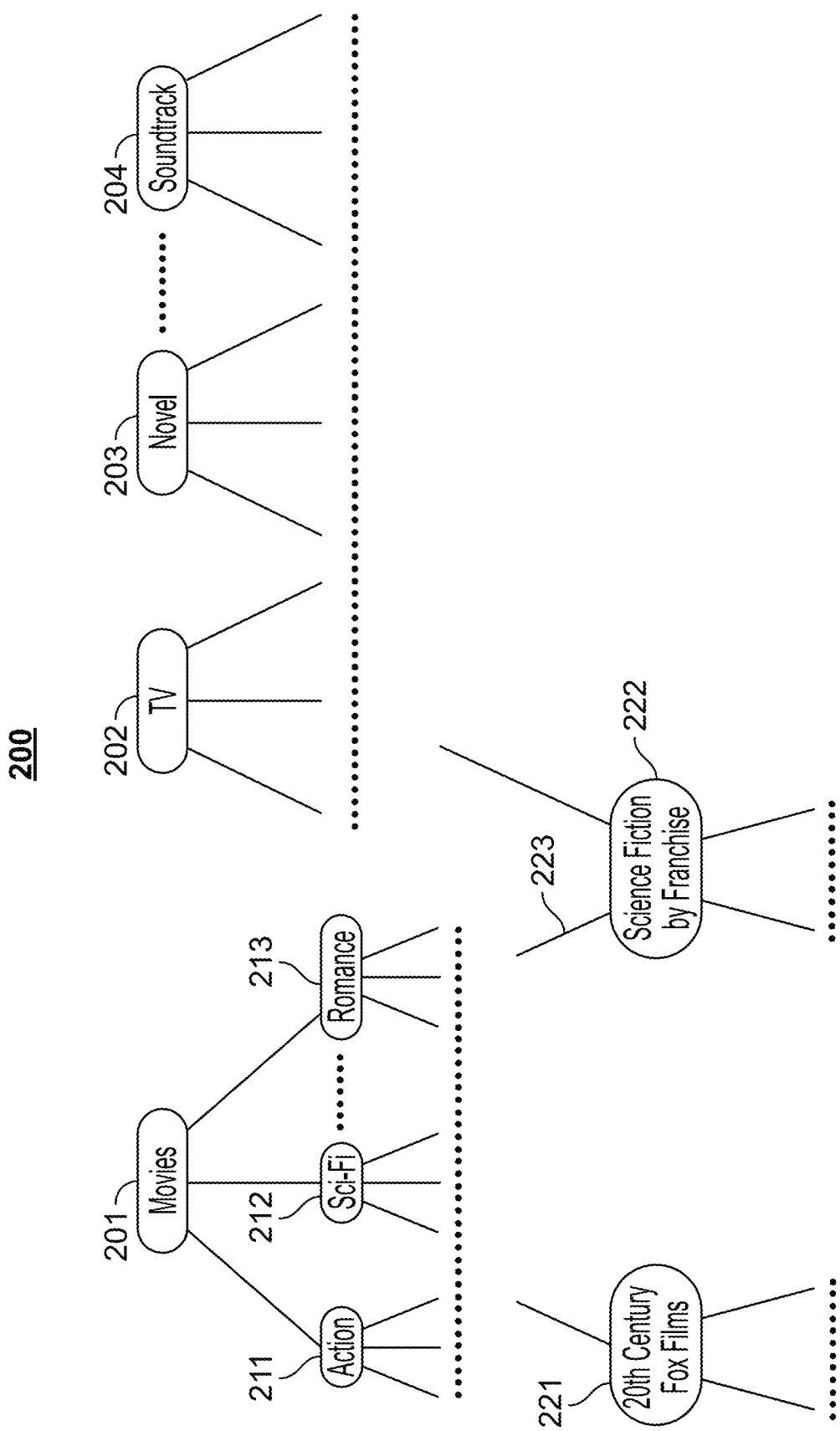
FIG. 2 depicts an illustrative diagram for an example pre-defined hierarchical structure, in accordance with some embodiments of the disclosure.

The media guidance application may retrieve, from a database (e.g., at storage 508 as described in relation to FIG. 5, or media guidance data source 618 as described in relation to FIG. 6), a pre-defined hierarchical structure describing a hierarchy of multiple levels of a plurality of subcategories. Specifically, the pre-defined hierarchical structure may include seed nodes each corresponding to a category. For example, diagram 200 in FIG. 2 depicts the pre-defined hierarchical structure, which may be saved as a tree structure in a database, e.g., storage 508 in FIG. 5 or data source 618 accessible via communications network 614 in FIG. 6. The pre-defined hierarchical structure may include a plurality of nodes, each of which is stored at a memory address and has a pointer pointing from one memory address to another when the corresponding two nodes are connected by an edge. The nodes are distributed among different levels, representing multiple levels of subcategories of an item. For example, the pre-defined hierarchical structure may include seed nodes (e.g., 201-204) corresponding to different categories (e.g., movies, television, novel, soundtrack, etc.) that the search term "Star Wars" may be subject to. Under the seed node "movie" 201, the pre-defined hierarchical structure may have a plurality of lower-level nodes representing subcategories such as "action" 211, "science fiction" 212, "romance" 213, and/or other suitable categories. For another example, under the node representing "science fiction" 212, the pre-defined hierarchical structure may have a plurality of subsequent lower-level nodes representing subcategories such as "aliens," "space," "robot," and/or other suitable categories. At a certain lower-level, the pre-defined hierarchical structure may further include nodes that may correspond to one or more tags from the structured data file, e.g., see "20$^{th}$ Century Fox Films" 221, "Science Fiction by Franchise" 222, and/or other suitable categories.

In some embodiments, the media guidance application may retrieve the pre-defined hierarchical structure based on an estimate of the search term. Specifically, the media guidance application may determine an estimate of one or more categories relating to a text of the search term, and retrieve the pre-defined hierarchical structure based on the estimate of one or more categories. For example, the media guidance application may estimate that the search term "Star Wars" is related to media asset categories, such as movies, books, television, etc. The media guidance application may retrieve the pre-defined hierarchical structure that is related to categories of a media asset, e.g., as shown at 200 in FIG. 2.

The media guidance application may use the pre-defined hierarchical structure to determine probability values based on the relationship between the seed nodes and the lower-level nodes. Each probability value may be indicative of a likelihood that the search term belongs to a category represented by a respective seed node. For example, based on the pre-defined hierarchical structure, the media guidance application may calculate a probability of 0.46 that the search term "Star Wars" belongs to the category of movies, a probability of 0.26 that the search term "Star Wars" belongs to the category of television, and so on. Further detail relating to using the hierarchical structure to determine a probability indicative of which category the search term is intended for is provided below in relation to FIG. 2.

The media guidance application may compare the probability values and determine that the search term is subject to the category that corresponds to the highest likelihood. Specifically, based on the comparing, the media guidance application may generate for display, search results based on the search term subject to one of the first category and the second category. In this example, the media guidance application may determine that the search term "Star Wars" belongs to the category of movies, and then perform a search of "Star Wars" in a database of movies, e.g., search results of "Star Wars" movies 115 are provided at user equipment 106.

FIG. 2 depicts an illustrative diagram for an example pre-defined hierarchical structure, in accordance with some embodiments of the disclosure. The media guidance application may use the pre-defined hierarchical structure 200 in FIG. 2 to determine a probability value for a category that a search term belongs to.

Specifically, the media guidance application may search, in the pre-defined hierarchical structure, for a respective node corresponding to a subcategory described by each respective tag from the plurality of tags, e.g., the tag "science fiction by franchise," etc. The media guidance application may traverse the pre-defined hierarchical structure from a seed node (e.g., 201) to a lower-level node (e.g., 211, 212 or 213) using a breadth-first search procedure, which is a search procedure that starts at the root nodes of a tree or graph structure and traverses neighbor nodes at the same level first before moving to the next level neighbor nodes. For example, under the breadth-first search procedure, the media guidance application may start from seed node 201, traverse each node 211-213 at the first lower level, and then continue to move to the next lower level under the first lower level.

The media guidance application may determine whether the subcategory (e.g., "action" at 211) corresponding to the lower-level node 211 matches the subcategory (e.g., "science fiction by franchise") described by the respective tag. In response to determining that the subcategory matches the subcategory described by the tag, the media guidance application may identify the lower-level node as the node representing the respective tag. In this example, in response to determining that the subcategory (e.g., "action") does not match the subcategory (e.g., "science fiction by franchise") described by the respective tag, the media guidance application may continue traversing the pre-defined hierarchical structure from the lower-level node 211 to subsequent lower-level nodes using the breadth-first search procedure until a subsequent subcategory, e.g., "science fiction by franchise" at node 222, corresponding to a subsequent lower-level node matches the subcategory described by the respective tag. The media guidance application may then identify the subsequent lower-level node 222 as the node representing the respective tag for "Science Fiction by Franchise." Further detail relating to using the breadth-first search procedure to locate a node that matches the subcategory described by a tag is discussed in relation to FIG. 8.

In some embodiments, to determine whether a subcategory corresponding to a node matches the subcategory corresponding to the respective tag, the media guidance application may compare textual data corresponding to the subcategory of the node with textual data of the respective tag. For example, the pre-defined hierarchical structure may not use the exact wording for each subcategory as the subcategory described by the respective tag, e.g., node 222 may correspond to the subcategory of "Sci-Fi by Franchise" instead of "Science Fiction by Franchise." The media guidance application may determine whether a threshold amount of the text data corresponding to the subcategory of the node 222 matches the textual data of the respective tag. In this example, in response to determining that the subcategory corresponding to node 222, "Sci-Fi by Franchise," has met the threshold amount of textual data with the respective tag "Science Fiction by Franchise," the media guidance application may determine that the subcategory corresponding to node 222 matches the subcategory described by the respective tag.

In some embodiments, to determine whether a subcategory corresponding to a node matches the subcategory corresponding to the respective tag, the media guidance application may retrieve a plurality of textual subcategory names (e.g., "Sci-Fi by Franchise," "SF by Franchise," "Franchise in Sci-Fi," etc.) relating to the respective tag (e.g., "Science Fiction by Franchise"), and each textual subcategory name is a variation of and indicates the same subcategory as the respective tag. Specifically, the media guidance application may determine whether the subcategory corresponding to the node matches any textual subcategory name from the plurality of textual category names. In response to determining that the subcategory corresponding to the node matches at least one textual category name from the plurality of textual category names, the media guidance application may determine that the subcategory corresponding to the node matches the subcategory described by the tag.

In some embodiments, the media guidance application may determine a path connecting a seed node to a respective node corresponding to the subcategory described by the respective tag. Specifically, in response to locating the respective node corresponding to the subcategory described by the respective tag, the media guidance application may determine, within the pre-defined hierarchical structure, a path from the seed node to the respective node. For example, the media guidance application may determine, within the pre-defined hierarchical structure, a path from the seed node 201 to the node 222, and the length of the path indicates a likelihood that the tag "science fiction by franchise" belongs to the category of movies represented by the seed node 201. The longer the path is, the less likely the textual tag belongs to the respective category. For example, the tag "$20^{th}$ century Fox films" 221 may have a relatively shorter path "to the seed node "movie" 201, e.g., "20th Century Fox films→American films by studio→American films→movies by country→movies," as the tag is more likely to be related to the category "movie." However, the tag "20th century Fox films" 221 may have a relatively longer path to, or may even not be connected to the seed node "novel" 203, as the tag is rather unlikely to be related to the category "novel."

The media guidance application may calculate the length for the path connecting the respective node corresponding to the respective tag with the seed node. For example, the media guidance application may traverse the pre-defined hierarchical structure along the path connecting the respective node (e.g., "science fiction by franchise" 222) to a seed node (e.g., "movies" 201), and progressively include or count each edge (e.g., 223) that leads to a node at a next level towards the seed node "movies" 201 while moving along the path. In this way, the media guidance application may determine the length of the path based on a number of edges of the path. For example, if a number of eight edges need to be traversed from node "science fiction by franchise" 222 to the seed node "movies" 201, the length of the path connecting node 222 to seed node 201 is determined to be eight. For another example, if a number of five edges need to be traversed from node "science fiction by franchise" 222 to the seed node "novels" 201, the length of the path connecting node 222 to seed node 203 is determined to be five.

In some embodiments, the media guidance application may use a nominal value to denote a length when no node in the pre-defined hierarchical structure matches the subcategory described by a respective tag. Specifically, in response to determining that no node in the pre-defined hierarchical structure matches the subcategory described by the respective tag, the media guidance application may allocate a pre-defined path length to denote a distance between the respective tag and either of the first seed node and the second seed node. For example, the pre-defined hierarchical structure 200 may not have a node representing an example tag "3D augmented reality simulated environment," etc. In another embodiment, after locating a respective node (e.g., 222) corresponding to the subcategory described by the respective tag (e.g., "science fiction by franchise"), the media guidance application may determine that the respective node is not connected to a seed node. For example, the node "science fiction by franchise" 222 may not be connected to seed node "soundtrack" 204. In this case, the media guidance application may allocate a pre-defined path length (e.g., a relatively large value, usually much larger than the longest path within the pre-defined hierarchical structure, such as 10000, 50000, or another suitable value) to denote a distance between the respective tag and the seed node.

In some embodiments, the media guidance application may calculate a probability value corresponding to a seed node that the structured data file is related to the category represented by the seed node. Specifically, the media guidance application may calculate the value based on the length connecting the seed node and a respective tag combined for all tags of the plurality of tags. For example, the media guidance application may calculate the probability value based on the lengths of paths connecting the seed node and nodes representing all tags of the plurality of tags in the document. To calculate the respective probability, the media guidance application may designate a unit vector to each seed node, e.g., $\hat{x}_1, \hat{x}_2 \ldots$ as independent unit vectors in t-dimensional space where t is the total number of seed nodes. In the example shown at 200, the seed nodes "movies" 201, "television" 202, "novel" 203 and "soundtrack" 204 may be represented by a group of four unit vectors such as $\hat{x}_1=\{1,0,0,0\}, \hat{x}_2=\{0,1,0,0\}, \hat{x}_3=\{0,0,1,0\}, \hat{x}_4=\{0,0,0,1\}$.

The media guidance application may determine a tag vector corresponding to each tag. Specifically, the media guidance application may determine a respective tag vector corresponding to a respective tag by calculating a weighted sum of all unit vectors, each of the unit vectors may be weighted by the length of the path connecting the node representing the tag and the respective seed node. For example, for the four seed unit vectors $\hat{x}_1$ (movies), $\hat{x}_2$ (television), $\hat{x}_3$ (novel) and $\hat{x}_4$ (soundtrack), the media guidance application may designate the length between i-th category tag to these seeds as $D_{i1}, D_{i2}, D_{i3}, D_{i4}$, e.g., $D_{i1}$ denotes the shortest distance from the i-th tag to seed node 201, $D_{i2}$ denotes the shortest distance from the i-th tag to seed node 202, $D_{i3}$ denotes the shortest distance from the i-th tag to seed node 203, and $D_{i4}$ denotes the shortest distance from the i-th tag to seed node 204. As discussed above, when there is no path that connects the nodes representing the i-th tag to a specific seed node, e.g., either the node representing the i-th tag does not exists or the node is not connected to the seed node, the path length is assigned to a large value L where 1/L is approximate to 0. The media guidance application may calculate a tag vector corresponding to the i-th tag as $\vec{C}_i = D_{i1}\hat{x}_1 + D_{i2}\hat{x}_2 + D_{i3}\hat{x}_3 + D_{i4}\hat{x}_4$. For example, for the tag "21th century fox films" 201, the tag vector $\vec{C}_1 = 4\hat{x}_1 + L\hat{x}_2 + L\hat{x}_3 + L\hat{x}_4$.

In some embodiments, if the document has a number m of tags from the N tags that have different priorities (e.g., higher or lower), the tag vector for the n-th tag from the m tags is calculated as $\vec{P}_n = ((n-1)(|\vec{C}_n|/m) + |\vec{C}_n|)\vec{C}_n$.

In some embodiments, the media guidance application may determine a document vector representing the structured data file. Specifically, the media guidance application may determine a document vector by summing all tag vectors for the plurality of tags, and the coefficient for each unit vector in the document vector may be calculated as a harmonic mean of weights corresponding to the unit vector over all tag vectors. For example, if there are a number N tags in the document, the media guidance application may calculate the document vector as:

$$\vec{E} = (\text{harmonic\_mean}(D_{11}, \ldots, D_{N1})/N)\hat{x}_1 + (\text{harmonic\_mean}(D_{12}, \ldots, D_{N2})/N)\hat{x}_2 + (\text{harmonic\_mean}(D_{13}, \ldots, D_{N3})/N)\hat{x}_3 + (\text{harmonic\_mean}(D_{14}, \ldots, D_{N4})/N)\hat{x}_4$$

where the harmonic mean of $(D_{11}, \ldots, D_{N1})$ is defined as $N/\{1/D_{11} + \ldots + 1/D_{N1}\}$.

The media guidance application may calculate a first probability value by normalizing the first coefficient based on the document vector. For example, for the i-th seed node, a probability that the document belongs to the category represented by the i-th seed node is calculated as $1 - (\vec{E} \cdot \hat{x}_i)/|\vec{E}|$, where $|\vec{E}|$ denotes the absolute value of the vector P.

For example, if assuming that the structured data file only has two tags, corresponding to nodes 221 and 222 in FIG. 2; the two tags have the same priority; and only three seed nodes 201-203 are considered here: for node 221 "20$^{th}$ century fox films," the path connecting node 221 and the seed node 201 "movies" may include: 20$^{th}$ Century Fox films→American films by studio→American films→Films by country→Films. In this case, node 221 "20$^{th}$ century fox films" is not connected to seed node "television" 202 or "novel" 203, then the tag vector is calculated as $\vec{C}_1 = 4\hat{x}_1 + L\hat{x}_2 + L\hat{x}_3$. For node 222 "science fiction by franchise," the tag vector may be calculated as $\vec{C}_2 = 3\hat{x}_1 + 4\hat{x}_2 + 3\hat{x}_3$. Then the addition of the two tag vectors may be calculated as:

$$\vec{E} = (\text{harmonic\_mean}(D_{11}, D_{20})/2)\hat{x}_1 + (\text{harmonic\_mean}(D_{12}, D_{22})/2)\hat{x}_2 + (\text{harmonic\_mean}(D_{13}, D_{23})/2)\hat{x}_3$$

After skipping the term L (which approximates infinity) the resulting document vector can be calculated as $\vec{E} = 3.4\hat{x}_1 + 2\hat{x}_2$. Thus, as the coefficient for the first unit vector is greater than the second coefficient, the structured data file may be closer to the category "television" than to the category "movies." The media guidance application may accordingly determine a first probability that the search term "Star Wars" is indicative of a "movie" (from seed node 201) and a second probability that the search term "Star Wars" is indicative of a "television" (from seed node 202). For example, the probability of the first category=1−3.4/|C|=0.14, and the probability of the second category=1−2/|C|=0.51.

The media guidance application may generate search results based on the probability values. Specifically, the media guidance application may compare the first value and the second value, and generate for display, based on the comparing, search results based on the search term subject to one of the first category and the second category. In the above example, in response to determining that the first probability is greater than the second probability, the media guidance application may perform a search subject to the first category, e.g., in a movie database, for the search term "Star Wars," and provide a search result, e.g., Star Wars movies. In response to determining that the first probability is less than the second probability, the media guidance application may perform a search subject to the second category, e.g., in a television series database, for the search term "Star Wars," and provide a search result of the Star Wars television series.

Figure 3:
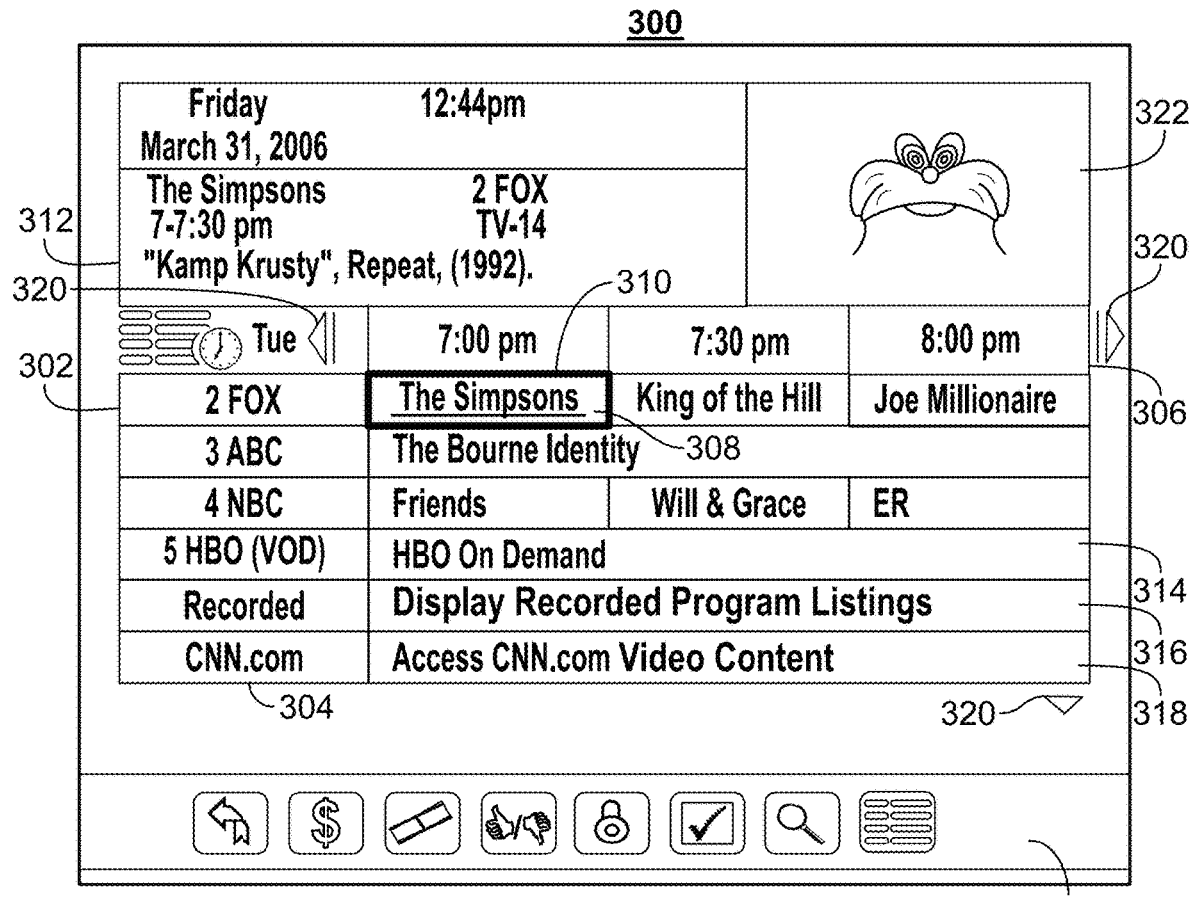
FIG. 3 shows an illustrative embodiment of a display screen that may be used to provide media guidance application listings and other media guidance information, in accordance with some embodiments of the disclosure.
Figure 4:
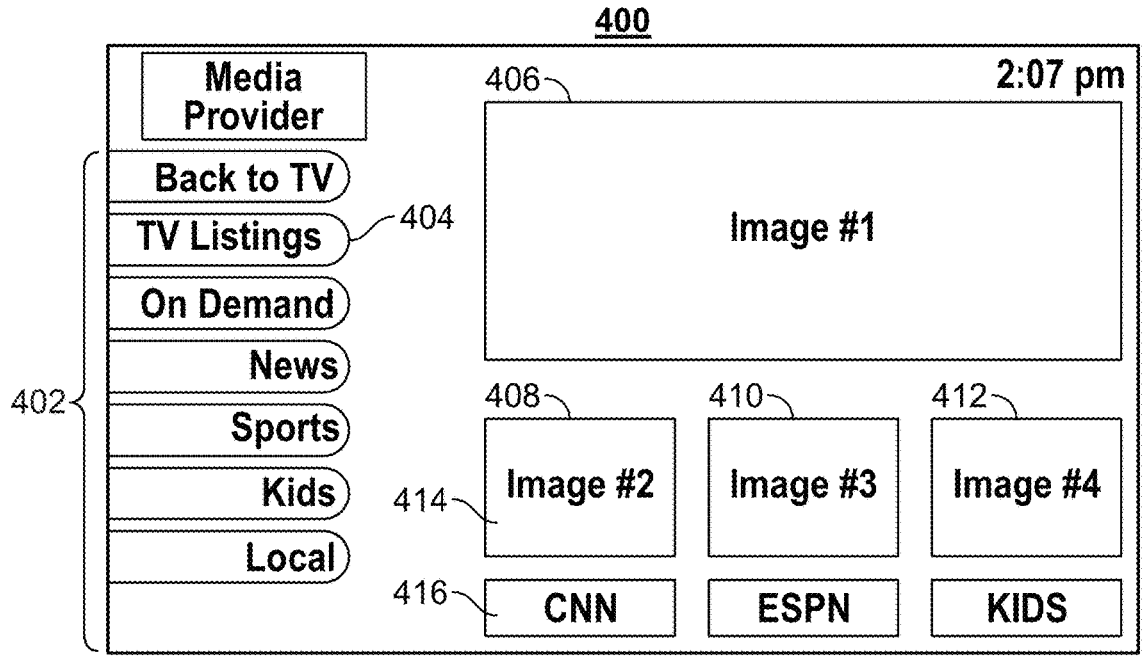
FIG. 4 shows another illustrative embodiment of a display screen that may be used to provide media guidance application listings, in accordance with some embodiments of the disclosure.

FIGS. 3-4 show illustrative display screens that may be used to provide media guidance data. The display screens shown in FIGS. 3-4 may be implemented on any suitable user equipment device or platform, e.g., user equipment 106 in FIG. 1. While the displays of FIGS. 3-4 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

As referred to herein, the term "category" refers to a class that a specific item may belong to. For example, the item "Star Wars" may indicate a category of movie, novel, television series, and/or the like. As referred to herein, the term "subcategory" refers to a sub-class of a category, which the item belongs to. For example, a subcategory under the category of movie may include action, romance, drama, thriller, documentary, and/or the like. As referred to herein, the term "tag" refers to an indicator, textual or in other forms, associated with at least a part of the content of a document, which indicates a subcategory of the item that the part of the content of the document relates to.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer-readable media. Computer-readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

It is to be noted that embodiments described herein may be implemented by a media guidance application, or any other data search tool that is configured to access the World Wide Web (www) and/or a databased of previously stored documents.

With the advent of the Internet, mobile computing, and high-speed wireless networks, users are accessing media on user equipment devices on which they traditionally did not use. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters" or providers" logos, etc.), media format (e.g., standard definition, high definition, 3D, etc.), on-demand information, blogs, websites, and any other type of guidance data that is helpful for a user to navigate among and locate desired content selections.

As referred to herein, the term "in response to" refers to initiated as a result of. For example, a first action being performed in response to a second action may include interstitial steps between the first action and the second action. As referred to herein, the term "directly in response to" refers to caused by. For example, a first action being performed directly in response to a second action may not include interstitial steps between the first action and the second action.

FIG. 3 shows illustrative grid of a program listings display 300 arranged by time and channel that also enables access to different types of content in a single display. Display 300 may include grid 302 with: (1) a column of channel/content type identifiers 304, where each channel/content type identifier (which is a cell in the column) identifies a different channel or content type available; and (2) a row of time identifiers 306, where each time identifier (which is a cell in the row) identifies a time block of programming. Grid 302 also includes cells of program listings, such as program listing 308, where each listing provides the title of the program provided on the listing's associated channel and time. With a user input device, a user can select program listings by moving highlight region 310. Information relating to the program listing selected by highlight region 310 may be provided in program information region 312. Region 312 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 302 may provide media guidance data for non-linear programming including on-demand listing 314, recorded content listing 316, and Internet content listing 318. A display combining media guidance data for content from different types of content sources is sometimes referred to as a "mixed-media" display. Various permutations of the types of media guidance data that may be displayed that are different than display 300 may be based on user selection or guidance application definition (e.g., a display of only recorded and broadcast listings, only on-demand and broadcast listings, etc.). As illustrated, listings 314, 316, and 318 are shown as spanning the entire time block displayed in grid 302 to indicate that selection of these listings may provide access to a display dedicated to on-demand listings, recorded listings, or Internet listings, respectively. In some embodiments, listings for these content types may be included directly in grid 302. Additional media guidance data may be displayed in response to the user selecting one of the navigational icons 320. (Pressing an arrow key on a user input device may affect the display in a similar manner as selecting navigational icons 320.)

Display 300 may also include video region 322, and options region 326. Video region 322 may allow the user to view and/or preview programs that are currently available, will be available, or were available to the user. The content of video region 322 may correspond to, or be independent from, one of the listings displayed in grid 302. Grid displays including a video region are sometimes referred to as picture-in-guide (PIG) displays. PIG displays and their functionalities are described in greater detail in Satterfield et al. U.S. Pat. No. 6,564,378, issued May 13, 3003 and Yuen et al. U.S. Pat. No. 6,239,794, issued May 39, 3001, which are hereby incorporated by reference herein in their entireties. PIG displays may be included in other media guidance application display screens of the embodiments described herein.

Options region 326 may allow the user to access different types of content, media guidance application displays, and/or media guidance application features. Options region 326 may be part of display 300 (and other display screens described herein), or may be invoked by a user by selecting an on-screen option or pressing a dedicated or assignable button on a user input device. The selectable options within options region 326 may concern features related to program listings in grid 302 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 6. Additional personalized media guidance application features are described in greater detail in Ellis et al., U.S. Patent Application Publication No. 3005/0251827, filed Jul. 11, 3005, Boyer et al., U.S. Pat. No. 7,165,098, issued Jan. 16, 3007, and Ellis et al., U.S. Patent Application Publication No. 3002/0174430, filed Feb. 31, 3002, which are hereby incorporated by reference herein in their entireties.

Another display arrangement for providing media guidance is shown in FIG. 4. Video mosaic display 400 includes selectable options 402 for content information organized based on content type, genre, and/or other organization criteria. In display 400, television listings option 404 is selected, thus providing listings 406, 408, 410, and 412 as broadcast program listings. In display 400 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 408 may include more than one portion, including media portion 414 and text portion 416. Media portion 414 and/or text portion 416 may be selectable to view content in full-screen or to view information related to the content displayed in media portion 414 (e.g., to view listings for the channel that the video is displayed on).

The listings in display 400 are of different sizes (i.e., listing 406 is larger than listings 408, 410, and 412), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 5:
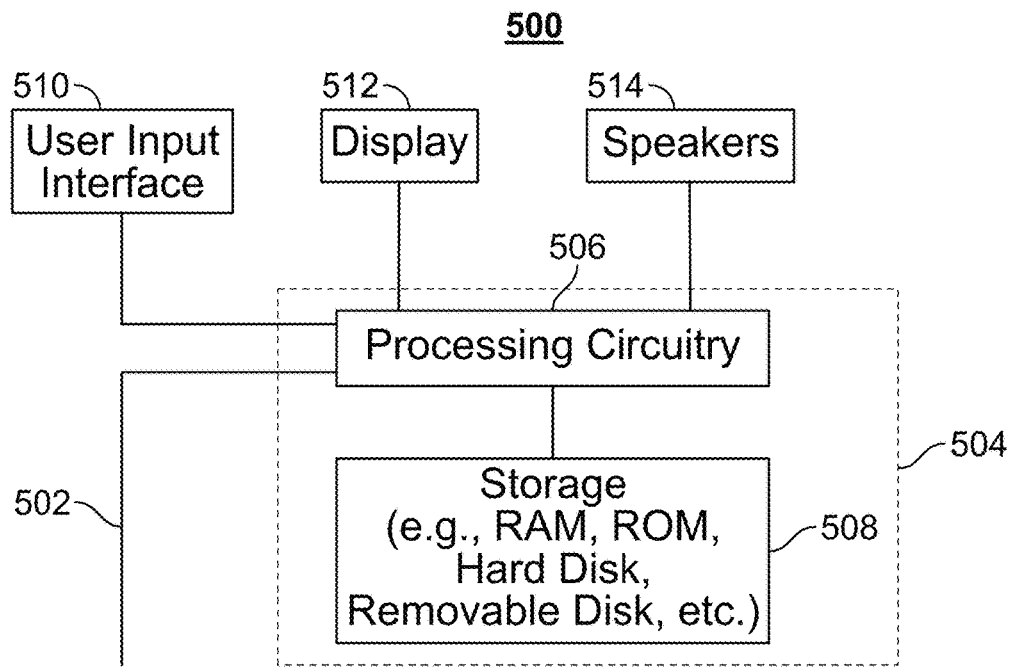
FIG. 5 is a block diagram of an illustrative user equipment (UE) device in accordance with some embodiments of the disclosure.

Users may access content and the media guidance application (and its display screens described above and below) from one or more of their user equipment devices. FIG. 5 shows a generalized embodiment of illustrative user equipment device 500. More specific implementations of user equipment devices are discussed below in connection with FIG. 6. User equipment device 500 may receive content and data via input/output (hereinafter "I/O") path 502. I/O path 502 may provide content (e.g., broadcast programming, on-demand programming, Internet content, content available over a local area network (LAN) or wide area network (WAN), and/or other content) and data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for a media guidance application stored in memory (i.e., storage 508). Specifically, control circuitry 504 may be instructed by the media guidance application to perform the functions discussed above and below. For example, the media guidance application may provide instructions to control circuitry 504 to generate the media guidance displays. In some implementations, any action performed by control circuitry 504 may be based on instructions received from the media guidance application.

In client-server based embodiments, control circuitry 504 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as media guidance data described above. Nonvolatile memory may also be used (e.g., to launch a boot-up routine and other instructions). Cloud-based storage, described in relation to FIG. 6, may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of the user equipment 500. Circuitry 504 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment 500, the tuning and encoding circuitry (including multiple tuners) may be associated with storage 508.

A user may send instructions to control circuitry 504 using user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of user equipment device 500. For example, display 512 may be a touchscreen or touch-sensitive display. In such circumstances, user input interface 510 may be integrated with or combined with display 512. Display 512 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 512 may be HDTV-capable. In some embodiments, display 512 may be a 3D display, and the interactive media guidance application and any suitable content may be displayed in 3D. A video card or graphics card may generate the output to the display 512. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 504. The video card may be integrated with the control circuitry 504. Speakers 514 may be provided as integrated with other elements of user equipment device 500 or may be stand-alone units. The audio component of videos and other content displayed on display 512 may be played through speakers 514. In some embodiments, the audio may be distributed to a receiver (not shown), which processes and outputs the audio via speakers 514.

The guidance application may be implemented using any suitable architecture. For example, it may be a stand-alone application wholly-implemented on user equipment device 500. In such an approach, instructions of the application are stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to generate any of the displays discussed herein. Based on the processed instructions, control circuitry 504 may determine what action to perform when input is received from input interface 510. For example, movement of a cursor on a display up/down may be indicated by the processed instructions when input interface 510 indicates that an up/down button was selected.

In some embodiments, the media guidance application is a client-server based application. Data for use by a thick or thin client implemented on user equipment device 500 is retrieved on-demand by issuing requests to a server remote to the user equipment device 500. In one example of a client-server based guidance application, control circuitry 504 runs a web browser that interprets web pages provided by a remote server. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on equipment device 500. This way, the processing of the instructions is performed remotely by the server while the resulting displays are provided locally on equipment device 500. Equipment device 500 may receive inputs from the user via input interface 510 and transmit those inputs to the remote server for processing and generating the corresponding displays. For example, equipment device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to equipment device 500 for presentation to the user.

In some embodiments, the media guidance application is downloaded and interpreted or otherwise run by an interpreter or virtual machine (run by control circuitry 504). In some embodiments, the guidance application may be encoded in the ETV Binary Interchange Format (EBIF), received by control circuitry 504 as part of a suitable feed, and interpreted by a user agent running on control circuitry 504. For example, the guidance application may be an EBIF application. In some embodiments, the guidance application may be defined by a series of JAVA-based files that are received and run by a local virtual machine or other suitable middleware executed by control circuitry 504. In some of such embodiments (e.g., those employing MPEG-2 or other digital media encoding schemes), the guidance application may be, for example, encoded and transmitted in an MPEG-2 object carousel with the MPEG audio and video packets of a program.

User equipment device 500 of FIG. 5 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 5 may not be classified solely as user television equipment 602, user computer equipment 604, or a wireless user communications device 606. For example, user television equipment 602 may, like some user computer equipment 604, be Internet-enabled allowing for access to Internet content, while user computer equipment 604 may, like some television equipment 602, include a tuner allowing for access to television programming. The media guidance application may have the same layout on various different types of user equipment or may be tailored to the display capabilities of the user equipment. For example, on user computer equipment 604, the guidance application may be provided as a web site accessed by a web browser. In another example, the guidance application may be scaled down for wireless user communications devices 606.

Figure 6:
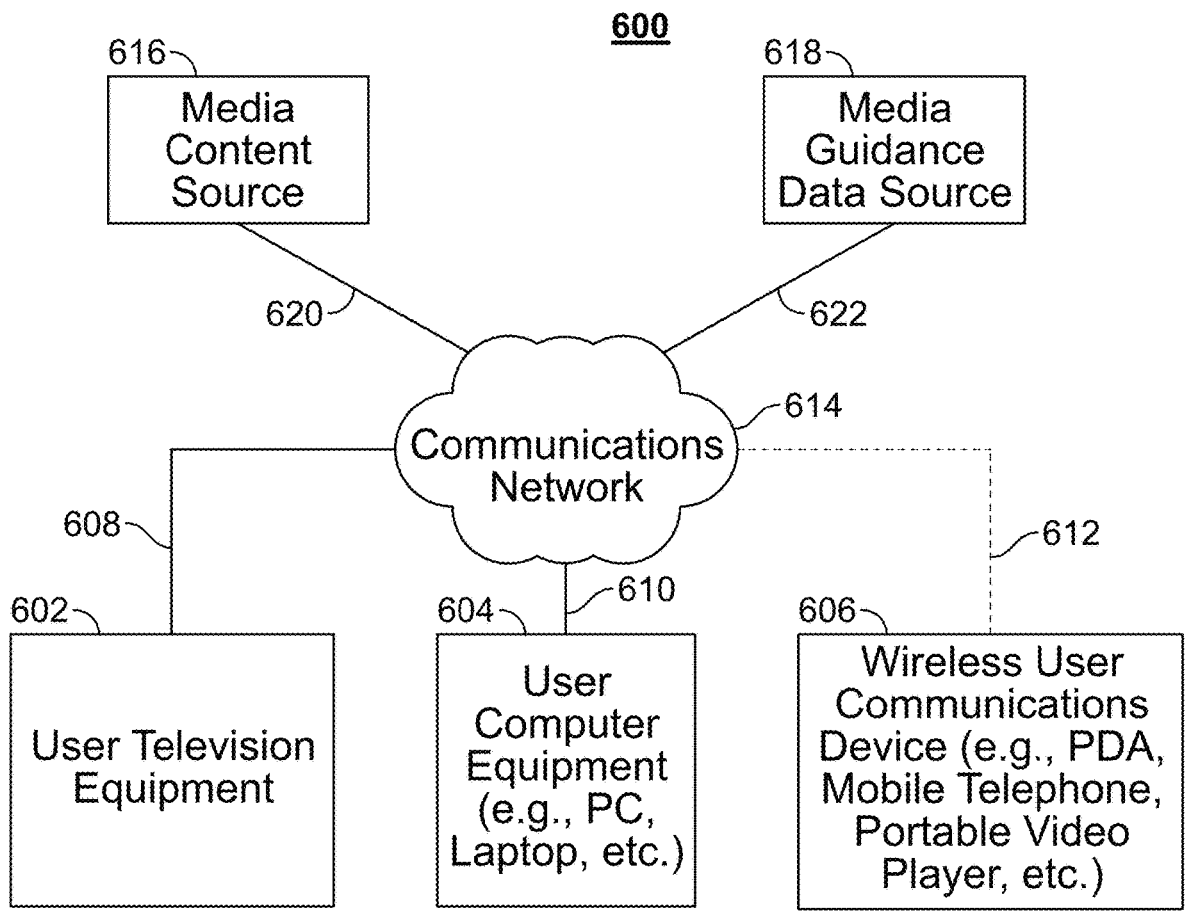
FIG. 6 is a block diagram of an illustrative media system in accordance with some embodiments of the disclosure.

In system 600, there is typically more than one of each type of user equipment device but only one of each is shown in FIG. 6 to avoid overcomplicating the drawing. In addition, each user may utilize more than one type of user equipment device and also more than one of each type of user equipment device.

In some embodiments, a user equipment device (e.g., user television equipment 602, user computer equipment 604, wireless user communications device 606) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 614. Namely, user television equipment 602, user computer equipment 604, and wireless user communications device 606 are coupled to communications network 614 via communications paths 608, 610, and 612, respectively. Communications network 614 may be one or more networks including the Internet, a mobile phone network, mobile voice or data network (e.g., a 4G or LTE network), cable network, public switched telephone network, or other types of communications network or combinations of communications networks. Paths 608, 610, and 612 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 612 is drawn with dotted lines to indicate that in the exemplary embodiment shown in FIG. 6 it is a wireless path and paths 608 and 610 are drawn as solid lines to indicate they are wired paths (although these paths may be wireless paths, if desired). Communications with the user equipment devices may be provided by one or more of these communications paths, but are shown as a single path in FIG. 6 to avoid overcomplicating the drawing.

Although communications paths are not drawn between user equipment devices, these devices may communicate directly with each other via communication paths, such as those described above in connection with paths 608, 610, and 612, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 614.

System 600 includes content source 616 and media guidance data source 618 coupled to communications network 614 via communication paths 620 and 622, respectively. Paths 620 and 622 may include any of the communication paths described above in connection with paths 608, 610, and 612. Communications with the content source 616 and media guidance data source 618 may be exchanged over one or more communications paths, but are shown as a single path in FIG. 6 to avoid overcomplicating the drawing. In addition, there may be more than one of each of content source 616 and media guidance data source 618, but only one of each is shown in FIG. 6 to avoid overcomplicating the drawing. (The different types of each of these sources are discussed below.) If desired, content source 616 and media guidance data source 618 may be integrated as one source device. Although communications between sources 616 and 618 with user equipment devices 602, 604, and 606 are shown as through communications network 614, in some embodiments, sources 616 and 618 may communicate directly with user equipment devices 602, 604, and 606 via communication paths (not shown) such as those described above in connection with paths 608, 610, and 612.

Content source 616 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 616 may be the originator of content (e.g., a television broadcaster, a Webcast provider, etc.) or may not be the originator of content (e.g., an on-demand content provider, an Internet provider of content of broadcast programs for downloading, etc.). Content source 616 may include cable sources, satellite providers, on-demand providers, Internet providers, over-the-top content providers, or other providers of content. Content source 616 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 618 may provide media guidance data, such as the media guidance data described above. Media guidance data may be provided to the user equipment devices using any suitable approach. In some embodiments, the guidance application may be a standalone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 618 may be provided to users" equipment using a client-server approach. For example, a user equipment device may pull media guidance data from a server, or a server may push media guidance data to a user equipment device. In some embodiments, a guidance application client residing on the user's equipment may initiate sessions with source 618 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 618 may provide user equipment devices 602, 604, and 606 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 508, and executed by control circuitry 504 of a user equipment device 500. In some embodiments, media guidance applications may be client-server applications where only a client application resides on the user equipment device, and server application resides on a remote server. For example, media guidance applications may be implemented partially as a client application on control circuitry 504 of user equipment device 500 and partially on a remote server as a server application (e.g., media guidance data source 618) running on control circuitry of the remote server. When executed by control circuitry of the remote server (such as media guidance data source 618), the media guidance application may instruct the control circuitry to generate the guidance application displays and transmit the generated displays to the user equipment devices. The server application may instruct the control circuitry of the media guidance data source 618 to transmit data for storage on the user equipment. The client application may instruct control circuitry of the receiving user equipment to generate the guidance application displays.

Content and/or media guidance data delivered to user equipment devices 602, 604, and 606 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 600 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 6.

In one approach, user equipment devices may communicate with each other within a home network. User equipment devices can communicate with each other directly via short-range point-to-point communication schemes described above, via indirect paths through a hub or other similar device provided on a home network, or via communications network 614. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 616 to access content. Specifically, within a home, users of user television equipment 602 and user computer equipment 604 may access the media guidance application to navigate among and locate desirable content. Users may also access the media guidance application outside of the home using wireless user communications devices 606 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 614. These cloud resources may include one or more content sources 616 and one or more media guidance data sources 618. In addition or in the alternative, the remote computing sites may include other user equipment devices, such as user television equipment 602, user computer equipment 604, and wireless user communications device 606. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 604 or wireless user communications device 606 having content capture feature. Alternatively, the user can first transfer the content to a user equipment device, such as user computer equipment 604. The user equipment device storing the content uploads the content to the cloud using a data transmission service on communications network 614. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 6.

Figure 7:
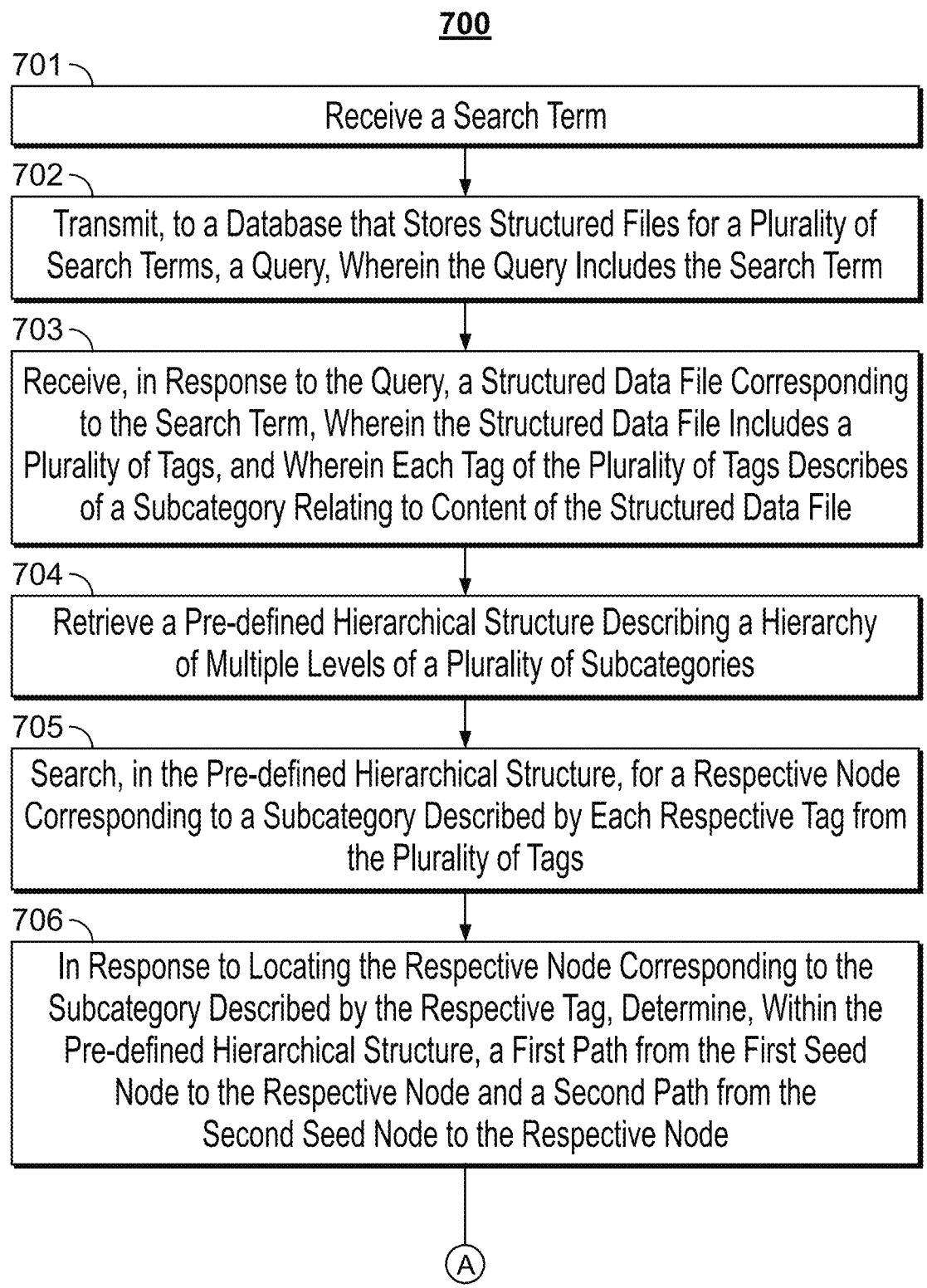
FIG. 7 depicts an illustrative flowchart of a process for providing search results subject to an identified category, in accordance with some embodiments of the disclosure.
Figure 7:
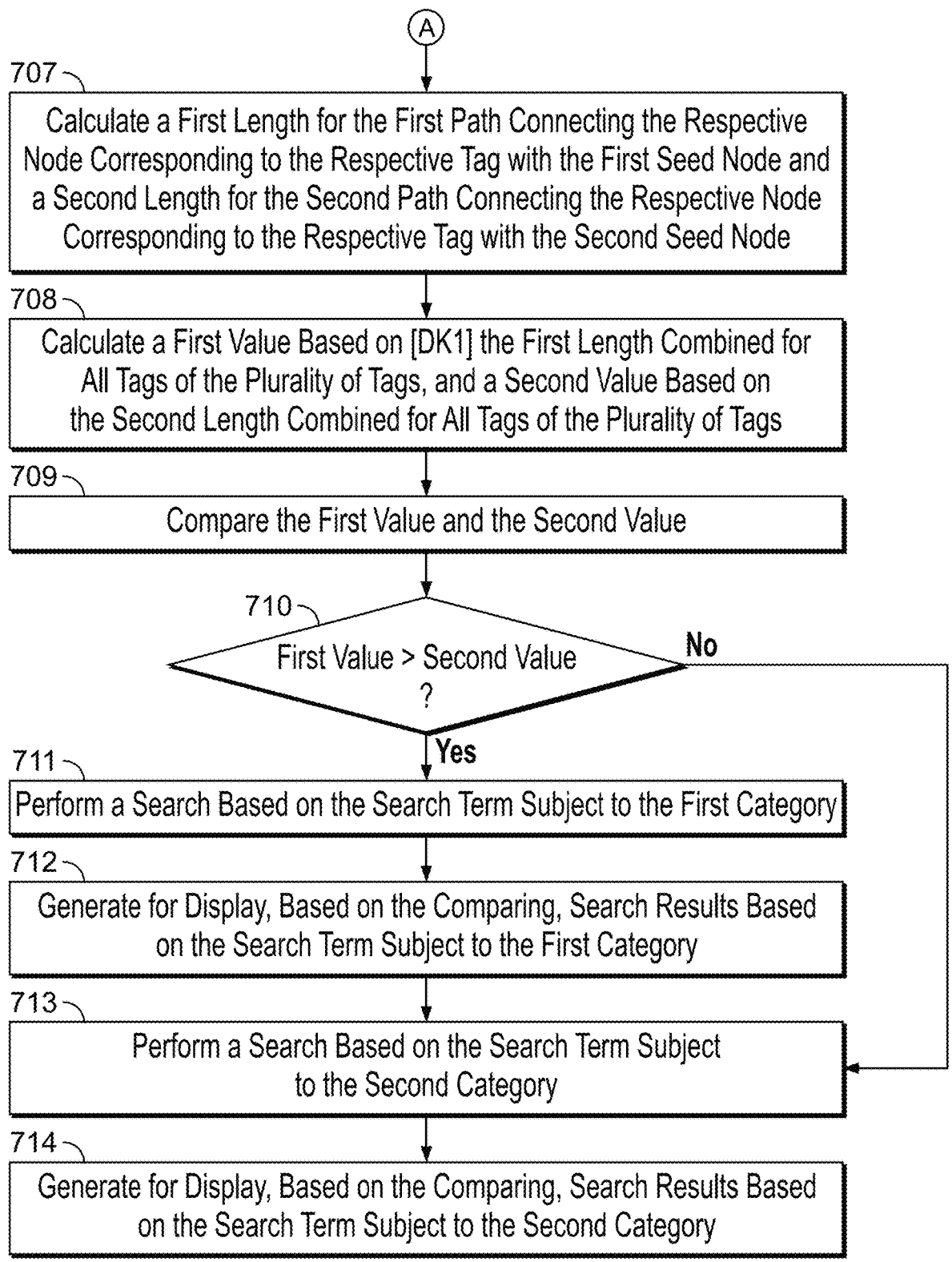

FIG. 7 depicts an illustrative flowchart of a process for providing search results subject to an identified category, in accordance with some embodiments of the disclosure. Process 700 may be executed by control circuitry 504 (e.g., in a manner instructed to control circuitry 504 by the media guidance application). Control circuitry 504 may be part of user equipment (e.g., user equipment 106, user television equipment 602, user computer equipment 604, and/or wireless communications device 606), or of a remote server separated from the user equipment by way of communications network 614.

Process 700 begins at 701, where control circuitry 504 receives a search term (e.g., "Star Wars" at 105 in FIG. 1), e.g., via an Input/Output (I/O) path 502 as described in relation to FIG. 5. At 702, control circuitry 504 transmits, to a database (e.g., at storage 508 in FIG. 5, or at a remote data source 618 in FIG. 6) that stores structured files for a plurality of search terms, a query, wherein the query includes the search term. At 703, control circuitry 504 receives, in response to the query, a structured data file (e.g., 110 in FIG. 1) corresponding to the search term. The structured data file includes a plurality of tags (e.g., 113 in FIG. 1), and each tag of the plurality of tags describes of a subcategory relating to content of the structured data file. At 704, control circuitry 504 retrieves (e.g., from storage 508 in FIG. 5, or at a remote data source 618 in FIG. 6) a pre-defined hierarchical structure (e.g., see 200 in FIG. 2) describing a hierarchy of multiple levels of a plurality of subcategories. The pre-defined hierarchical structure includes a first seed node (e.g., see 201 in FIG. 2) corresponding to the first category (e.g., "movies") and a second seed node (e.g., see 202 in FIG. 2) corresponding to the second category (e.g., "television"). At 705, control circuitry 504 searches, in the pre-defined hierarchical structure, for a respective node corresponding to a subcategory (e.g., "$20^{th}$ century fox films") described by each respective tag from the plurality of tags. At 706, in response to locating the respective node corresponding to the subcategory described by the respective tag, control circuitry 504 determines, within the pre-defined hierarchical structure, a first path from the first seed node to the respective node and a second path from the second seed node to the respective node, e.g., as further described in relation to FIG. 8. At 707, control circuitry 504 calculates a first length for the first path connecting the respective node corresponding to the respective tag with the first seed node and a second length for the second path connecting the respective node corresponding to the respective tag with the second seed node. At 708, control circuitry 504 calculates a first value based on the first length combined for all tags of the plurality of tags, and a second value based on the second length combined for all tags of the plurality of tags. The first or second value is indicative of a probability value that content of the structured data file relates to the first or second category. Further detail relating to calculating the first or the second value is described in relation to FIG. 9.

At 709, control circuitry 504 compares the first value and the second value. At 710, if the first value is greater than the second value, process 700 continues from 710 to 711, where control circuitry 504 perform a search based on the search term subject to the first category, and generate for display (e.g., see 115 in FIG. 1) search results based on the search term subject to the first category at 712. At 710, if the first value is no greater than the second value, process 700 continues from 710 to 713, where control circuitry 504 perform a search based on the search term subject to the second category, and then generate for display, (e.g., via the display 312 in FIG. 3, or any of 602, 604 and 606 in FIG. 6) search results based on the search term subject to the second category at 714, e.g., see 115 in FIG. 1.

Figure 8:
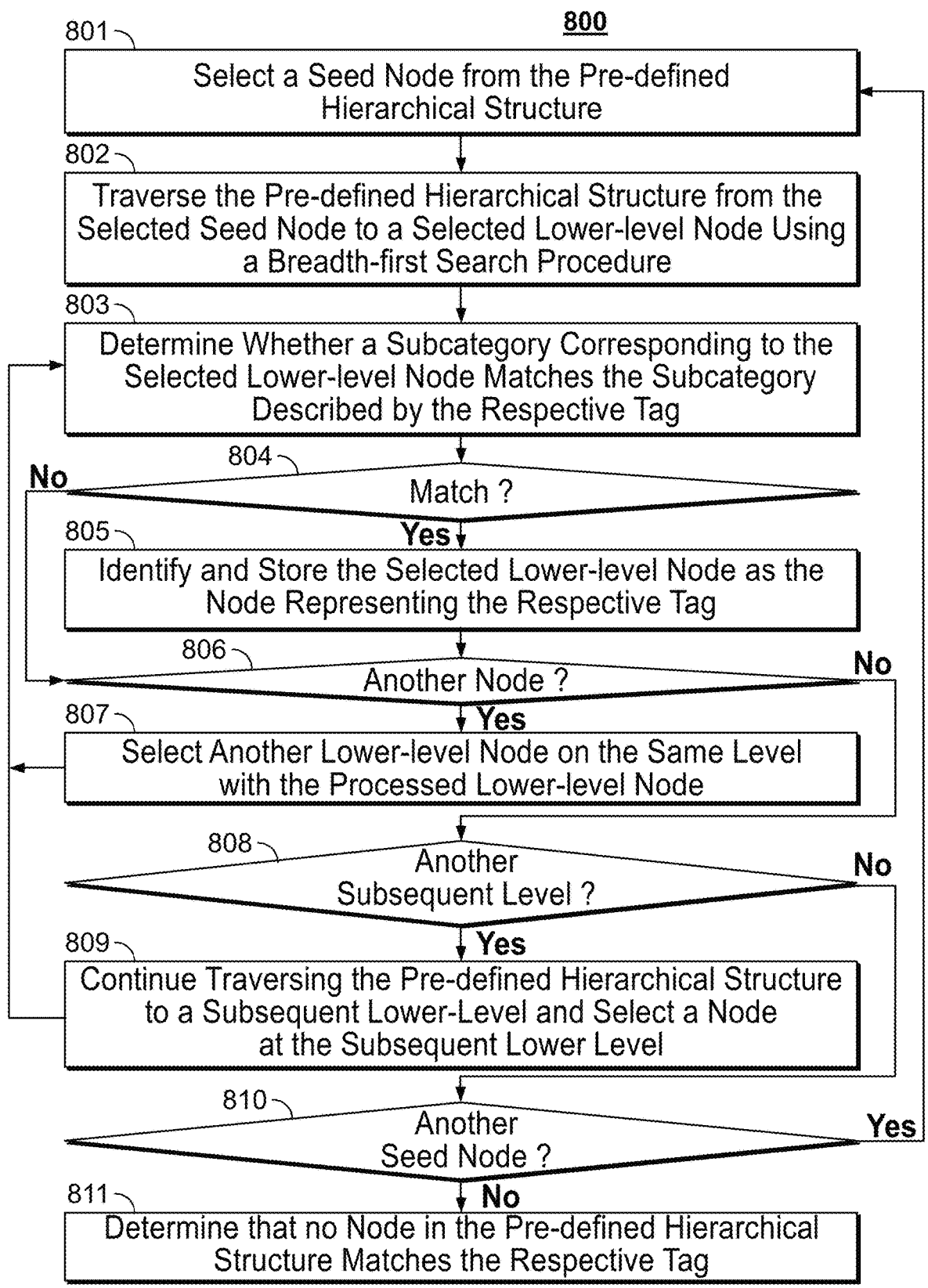
FIG. 8 depicts an illustrative flowchart of a process for searching, in the pre-defined hierarchical structure, for the respective node corresponding to the subcategory that matches the respective tag, in accordance with some embodiments of the disclosure.

FIG. 8 depicts an illustrative flowchart of a process for searching, in the pre-defined hierarchical structure, for the respective node corresponding to the subcategory that matches the respective tag (e.g., see 705 in FIG. 7), in accordance with some embodiments of the disclosure. Process 800 may be executed by control circuitry 504 (e.g., in a manner instructed to control circuitry 504 by the media guidance application). Control circuitry 504 may be part of user equipment (e.g., user equipment 106, user television equipment 602, user computer equipment 604, and/or wireless communications device 606), or of a remote server separated from the user equipment by way of communications network 614.

Process 800 begins at 801, where control circuitry 504 selects a seed node (e.g., see "movies" 201 in FIG. 2) in from the pre-defined hierarchical structure (e.g., see 200 in FIG. 2). At 802, control circuitry 504 traverses the pre-defined hierarchical structure from the selected seed node to a selected lower-level node (e.g., any one of 211-213 in FIG. 2) using a breadth-first search procedure. At 803, control circuitry 504 determines whether a subcategory corresponding to the selected lower-level node matches the subcategory described by the respective tag. At 804, in response to determining that the subcategory corresponding to the selected lower-level node matches the subcategory described by the tag, process 800 continues to 805, where control circuitry 504 identifies the selected lower-level node as the node representing the respective tag, and stores the selected lower-level node, e.g., the location of the selected lower-level node, and/or a pointer to the location, etc., at storage 508 in FIG. 5 or data source 618 in FIG. 6. At 804, in response to determining that the subcategory corresponding to the selected lower-level node matches the subcategory described by the tag, process 800 continues to 806, where control circuitry 504 determines whether there is another node at the same level in the pre-defined hierarchical structure with the selected lower-level node. For example, nodes 211-213 are on the same level in the pre-defined hierarchical structure 200 in FIG. 2. At 808, in response to determining that there is another node at the same level in the pre-defined hierarchical structure with the selected lower-level node, process 800 continues to 807, where control circuitry 504 selects another lower-level node at the same level with the processed lower-level node. From 807, process 800 then proceeds to 803, where control circuitry 504 continues with the currently selected lower-level node.

From 806, in response to determining that there is no other node at the same level in the pre-defined hierarchical structure with the selected lower-level node, process 800 continues to 808, where control circuitry 504 determines whether there is a subsequent level, e.g., process 800 has completed searching the current level and moved on to a next lower level. From 808, in response to determining that there is a subsequent level, process 800 continues to 809, where control circuitry continues traversing the pre-defined hierarchical structure to a subsequent lower level and selects a node at the subsequent lower level. Process 800 then proceeds from 809 to 803, where control circuitry 504 continues with the currently selected lower-level node, and repeats 803-807 to complete searching at the current lower level.

From 808, in response to determining that there is no other subsequent level, process 800 continues to 810, where control circuitry 504 determines whether there is another seed node in the hierarchical structure. From 801, in response to determining that there is another seed node in the hierarchical structure, process 800 proceeds to 801, where control circuitry 504 selects another seed node. For example, if control circuitry 504 has iterated every node and lower level below seed node "movies" 201 but no match has been found, control circuitry 504 then proceeds to start searching nodes below seed node "television" 202 in FIG. 2.

From 810, in response to determining that there is no other seed node, process 800 continues to 811, where control circuitry 504 determines that no node in the pre-defined hierarchical structure matches the respective tag. For example, if control circuitry 504 has iterated every node and every lower level under all seed nodes 201-204 in FIG. 2 but no match is found, control circuitry 504 determines that the subcategory corresponding to the respective tag does not exist in the pre-defined hierarchical structure. In this case, as described above, control circuitry 504 assigns a large value (usually much greater than the maximum length of a path existing in the pre-defined hierarchical structure) to denote a distance between each seed node and the respective tag.

Figure 9:
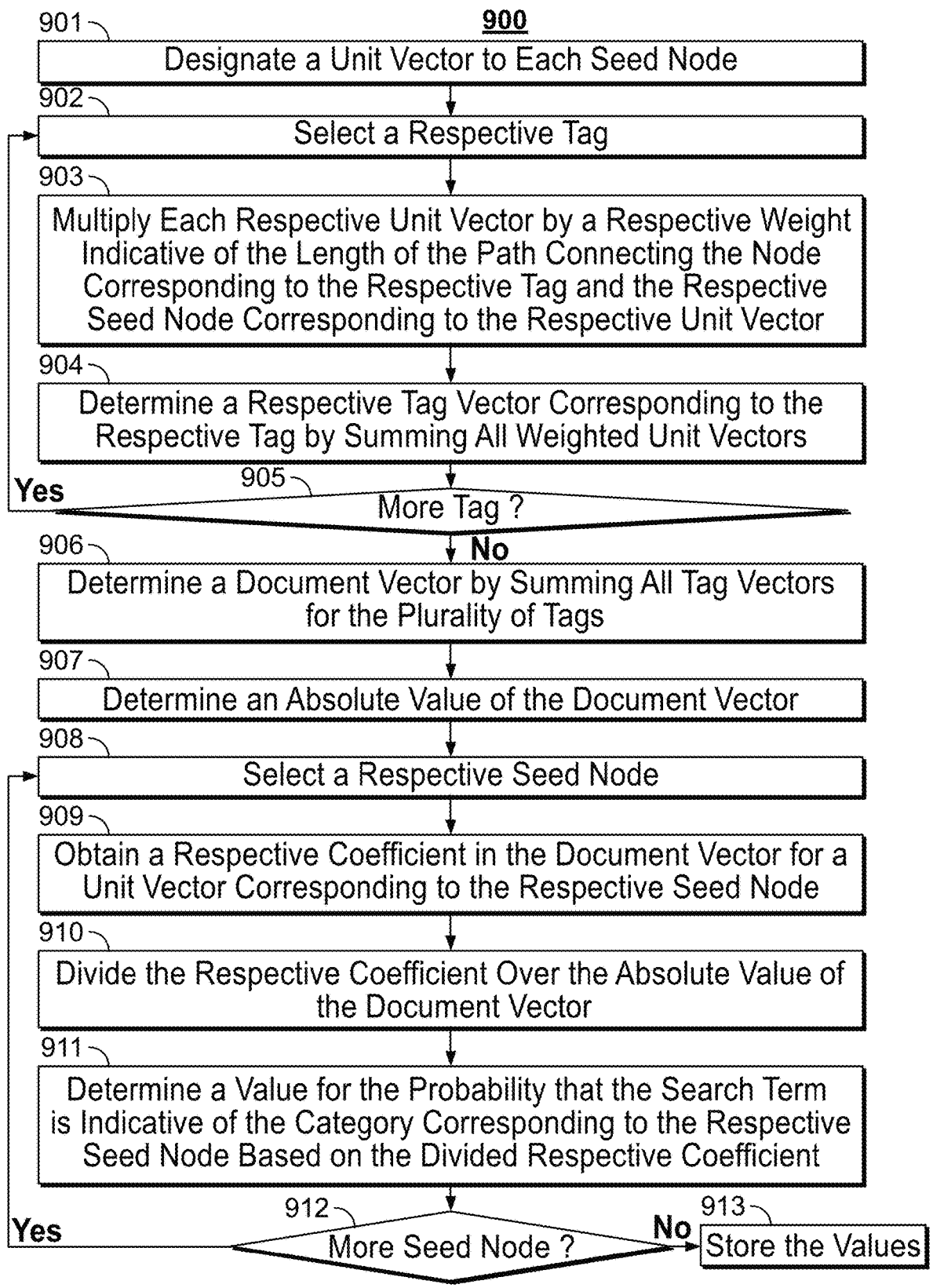
FIG. 9 depicts an illustrative flowchart of a process for calculating a probability value based on an aggregated mean of the length of the path connecting a tag node and a seed node over all tags of the plurality of tags, in accordance with some embodiments of the disclosure.

FIG. 9 depicts an illustrative flowchart of a process for calculating a probability value based on an aggregated mean of the length of the path connecting a tag node and a seed node over all tags of the plurality of tags (e.g., see 707-708 in FIG. 7), in accordance with some embodiments of the disclosure. Process 900 may be executed by control circuitry 504 (e.g., in a manner instructed to control circuitry 504 by the media guidance application). Control circuitry 504 may be part of user equipment (e.g., user equipment 106, user television equipment 602, user computer equipment 604, and/or wireless communications device 606), or of a remote server separated from the user equipment by way of communications network 614.

Process 900 begins at 901, where control circuitry 504 designates a unit vector to each seed node (e.g., see 201-204 in FIG. 2). At 902, control circuitry 504 selects a respective tag from the plurality of tags. At 903, control circuitry 504 multiplies each respective unit vector by a respective weight indicative of the length of the path connecting the node corresponding to the respective tag and the respective seed node corresponding to the respective unit vector. At 904, control circuitry 504 determines a respective tag vector corresponding to the respective tag by summing all weighted unit vectors. At 905, control circuitry 504 determines whether there is any other tag. From 905, in response to determining that there is another tag, process 900 continues to 902, and repeats 902-904. From 905, in response to determining that there is no more tag, process 900 proceeds to 906, where control circuitry 504 determines a document vector by summing all tag vectors for the plurality of tags. At 907, control circuitry 504 determines an absolute value of the document vector. At 908, control circuitry 504 selects a respective seed node, and then at 909, obtains a respective coefficient in the document vector for a unit vector corresponding to the respective seed node. At 901, control circuitry 504 divides the respective coefficient over the absolute value of the document vector. At 911, control circuitry 504 determines a value for the probability that the search term is indicative of the category corresponding to the respective seed node based on the divided respective coefficient, as discussed in relation to FIG. 2. At 912, process 900 determines whether there is more seed node. From 912, in response to determining that there is another seed node, process 900 continues to 908 and repeats 909-911 to determine a value for the probability that the search term is indicative of the category corresponding to the other seed node. From 912, in response to determining that there is no other seed node, process 900 continues to 913, where control circuitry 504 stores the values for all seed nodes at storage 508 in FIG. 5, or data source 618 accessible via communications network 614 in FIG. 6.

Figure 10:
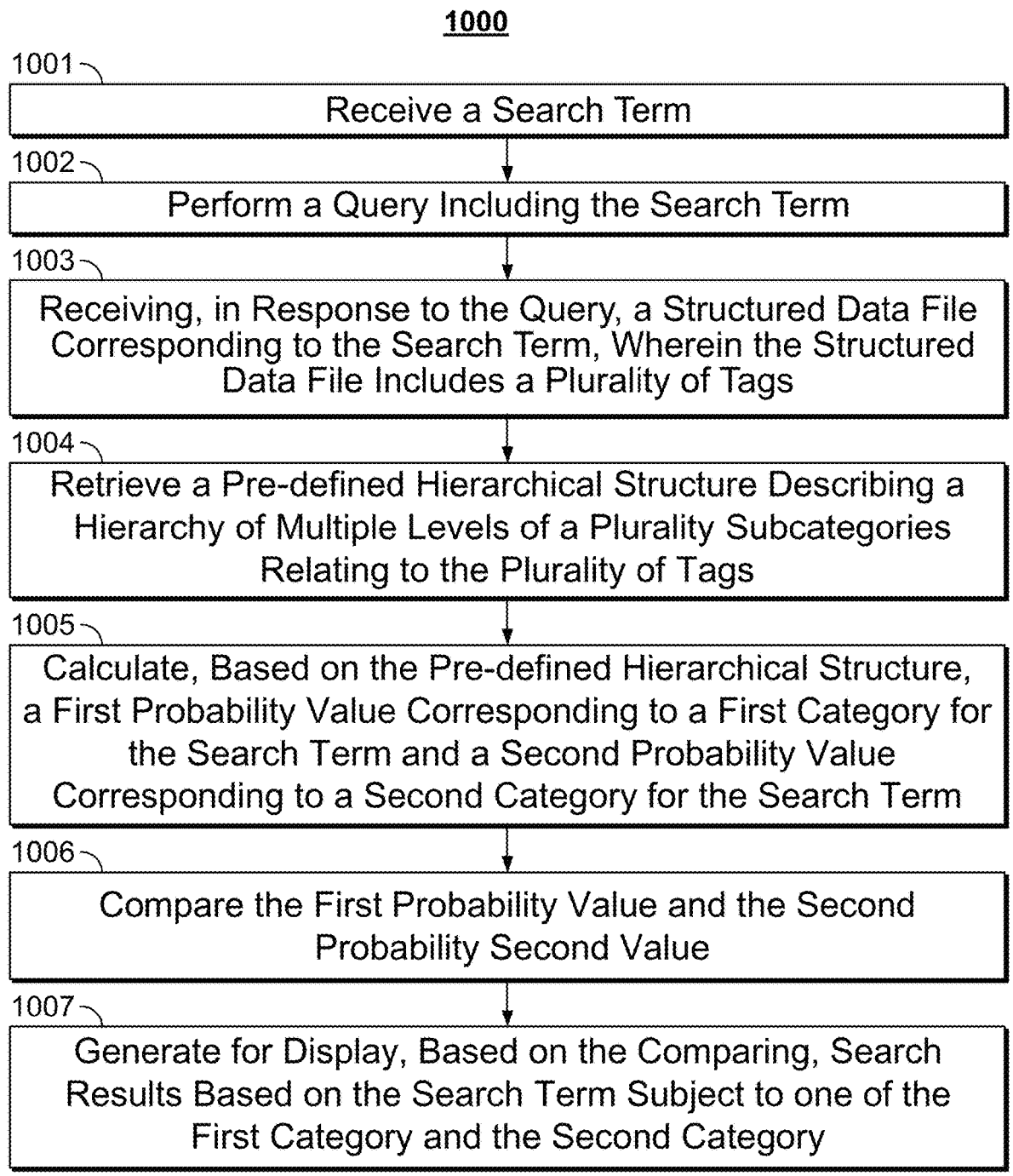
FIG. 10 depicts an illustrative flowchart of a process for providing search results subject to an identified category, in accordance with some embodiments of the disclosure.

FIG. 10 depicts an illustrative flowchart of a process for providing search results subject to an identified category, in accordance with some embodiments of the disclosure. Process 1000 may be executed by control circuitry 504 (e.g., in a manner instructed to control circuitry 504 by the media guidance application). Control circuitry 504 may be part of user equipment (e.g., user equipment 106, user television equipment 602, user computer equipment 604, and/or wireless communications device 606), or of a remote server separated from the user equipment by way of communications network 614.

Process 1000 begins at 1001, where control circuitry 504 receives a search term, e.g., via I/O path 502 in FIG. 5. At 1002, control circuitry 504 performs a query including the search term. At 1003, control circuitry 504 receives, in response to the query, a structured data file corresponding to the search term. The structured data file includes a plurality of tags. At 1004, control circuitry 504 retrieves a pre-defined hierarchical structure (e.g., from storage 508 in FIG. 5, or data source 618 via communications network 614 in FIG. 6) describing a hierarchy of multiple levels of a plurality of subcategories relating to the plurality of tags. At 1005, control circuitry 504 calculates, based on the pre-defined hierarchical structure, a first probability value corresponding to a first category for the search term and a second probability value corresponding to a second category for the search term. At 1006, control circuitry 504 compares the first probability value and the second probability second value. At 1007, control circuitry 504 generates for display (e.g., via the display 312 in FIG. 3, or any of 602, 604 and 606 in FIG. 6), based on the comparing, search results based on the search term subject to one of the first category and the second category.

It should be noted that processes 700-900 or any step thereof could be performed on, or provided by, any of the devices shown in, or described with respect to, FIGS. 1 and 5-6. For example, any of processes 700-1000 may be executed by control circuitry 504 (FIG. 5) as instructed by control circuitry implemented on user equipment 106 (FIG. 1), 602, 604, 606 (FIG. 6), and/or the like for generating and displaying a summary view of a media asset. In addition, one or more steps of processes 700-1000 may be incorporated into or combined with one or more steps of any other process or embodiment.

It is contemplated that the actions or descriptions of each of FIGS. 7-10 may be used with any other embodiment of this disclosure. In addition, the actions and descriptions described in relation to FIGS. 7-10 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1 and 5-6 could be used to perform one or more of the actions in FIGS. 7-10.

It will be apparent to those of ordinary skill in the art that methods involved in the present disclosure may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. For instance, calculating a probability value indicative of the probability that a search term relates to the category, e.g., by processing circuitry 506 of FIG. 5. The processing circuitry, for instance, may be a general purpose processor, a customized integrated circuit (e.g., an ASIC), or a field-programmable gate array (FPGA) within user equipment 500, media content source 616, or media guidance data source 618. For example, the pre-defined hierarchical structure, may be stored in, and retrieved from, storage 508 of FIG. 5, or media guidance data source 618 of FIG. 6. Furthermore, processing circuitry, or a computer program, may update configuration data of the media guidance application, which may be stored within storage 508 of FIG. 5 or media guidance data source 618 of FIG. 6.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method comprising:
receiving a search term;
identifying, using the search term, a structured data file comprising a plurality of tags, wherein each tag of the plurality of tags describes of a subcategory relating to content of the structured data file;

accessing a pre-defined hierarchical structure of categories and subcategories, the hierarchical structure comprising multiple levels of a hierarchy of nodes comprising a first seed node, a plurality of first lower-level nodes that are connected to the first seed node, a second seed node, and a plurality of second lower-level nodes that are connected to the second seed node;

for each tag of the plurality of tags:
identifying a first node of the plurality of first lower-level nodes and a second node of the plurality of second lower-level nodes that correspond to the tag;
computing a first distance between the first node and the first seed node and a second distance between the second node and the second seed node; and
generating a tag vector based, at least in part, on the first distance and the second distance;

computing a first probability value identifying a probability that the search term corresponds to a subcategory corresponding to the first seed node and a second probability value identifying a probability that the search term corresponds to a second category corresponding to the second seed node based, at least in part, on the tag vector; and determining that the first probability is greater than the second probability and, in response, generating for display, search results based, at least in part, on the search term subject to first category.

2. The method of claim 1, further comprising:
designating a first unit vector to the first seed node and a second unit vector to the second seed node;
computing a document vector for the search term by summing all tag vectors for the plurality of tags, wherein a first coefficient for the first unit vector in the document vector is calculated as a harmonic mean of weights corresponding to the first unit vector over all tag vectors and wherein a second coefficient for the second unit vector in the document vector is calculated as a harmonic mean of weights corresponding to the second unit vector over all tag vectors; and
computing the first probability value based, at least in part, on the first coefficient and computing the second probability value based, at least in part, on the second coefficient.

3. The method of claim 2, wherein computing the first probability value comprises normalizing the first coefficient based, at least in part, on the document vector and computing the second probability value comprises normalizing the second coefficient based, at least in part, on the document vector.

4. The method of claim 2, further comprising generating the tag vector as a weighted sum of the first unit vector and the second unit vector, wherein the first unit vector is weighted by the first distance and the second unit vector is weighted by the second distance.

5. The method of claim 2, further comprising:
traversing the pre-defined hierarchical structure from the first seed node to the first node through a breadth-first search; and
wherein identifying the first node comprises determining that a threshold amount of textual data of a first subcategory corresponding to the first node matches the textual data of the first tag.

6. The method of claim 1, wherein the accessing the pre-defined hierarchical structure of categories and subcategories comprises:
determining an estimate of one or more categories relating to a text of the search term; and retrieving the pre-defined hierarchical structure based, at least in part, on the estimate of one or more categories, wherein the estimate of one or more categories includes at least one of the first category or the second category.

7. The method of claim 1, wherein identifying the first node comprises:
retrieving a plurality of textual subcategory names relating to the respective tag, wherein each textual subcategory name indicates a same subcategory as the respective tag;
determining whether a first subcategory corresponding to the first node matches any textual category name from the plurality of textual category names; and
in response to determining that the first subcategory corresponding to the first node matches a textual category name from the plurality of textual category names, determining that the first subcategory corresponding to the first node matches the subcategory described by the tag.

8. The method of claim 1, further comprising determining a first path from the first seed node to the first node by traversing the pre-defined hierarchical structure from the first seed node to the first node and progressively including each edge that leads to a node at a next level.

9. The method of claim 8, further comprising computing the first distance based, at least in part, on a number of edges in the first path.

10. The method of claim 1, wherein the pre-defined hierarchical structure comprises a third seed node and a plurality of third lower-level nodes that are connected to the third seed node, and wherein the method further comprises, for a particular tag of the plurality of tags:
determining that no node of the plurality of third lower-level nodes matches a subcategory corresponding to the particular tag; and
in response to determining that no node of the plurality of third lower-level nodes matches the subcategory corresponding to the particular tag, allocating a pre-defined path length to denote a distance from the particular tag to the third seed node.

11. A system comprising:
communication circuitry configured to receive a search term; and
control circuitry configured to:
identify, using the search term, a structured data file comprising a plurality of tags, wherein each tag of the plurality of tags describes of a subcategory relating to content of the structured data file;
access a pre-defined hierarchical structure of categories and subcategories, the hierarchical structure comprising multiple levels of a hierarchy of nodes comprising a first seed node, a plurality of first lower-level nodes that are connected to the first seed node, a second seed node, and a plurality of second lower-level nodes that are connected to the second seed node;
for each tag of the plurality of tags:
identify a first node of the plurality of first lower-level nodes and a second node of the plurality of second lower-level nodes that correspond to the tag;
compute a first distance between the first node and the first seed node and a second distance between the second node and the second seed node; and
generate a tag vector based, at least in part, on the first distance and the second distance;

compute a first probability value identifying a probability that the search term corresponds to a subcategory corresponding to the first seed node and a second probability value identifying a probability that the search term corresponds to a second category corresponding to the second seed node based, at least in part, on the tag vector; and determine that the first probability is greater than the second probability and, in response, generating for display, search results based, at least in part, on the search term subject to first category.

12. The system of claim 11, wherein the control circuitry is further configured to:

designate a first unit vector to the first seed node and a second unit vector to the second seed node;

compute a document vector for the search term by summing all tag vectors for the plurality of tags, wherein a first coefficient for the first unit vector in the document vector is calculated as a harmonic mean of weights corresponding to the first unit vector over all tag vectors and wherein a second coefficient for the second unit vector in the document vector is calculated as a harmonic mean of weights corresponding to the second unit vector over all tag vectors; and compute the first probability value based, at least in part, on the first coefficient and computing the second probability value based, at least in part, on the second coefficient.

13. The system of claim 12, wherein the control circuitry is further configured to compute the first probability value by normalizing the first coefficient based, at least in part, on the document vector and computing the second probability value comprises normalizing the second coefficient based, at least in part, on the document vector.

14. The system of claim 12, wherein the control circuitry is further configured to generate the tag vector as a weighted sum of the first unit vector and the second unit vector, wherein the first unit vector is weighted by the first distance and the second unit vector is weighted by the second distance.

15. The system of claim 12, wherein the control circuitry is further configured to:

traverse the pre-defined hierarchical structure from the first seed node to the first node through a breadth-first search; and identify the first node by determining that a threshold amount of textual data of a first subcategory corresponding to the first node matches the textual data of the first tag.

16. The system of claim 11, wherein the control circuitry is further configured to access the pre-defined hierarchical structure of categories and subcategories by:

determining an estimate of one or more categories relating to a text of the search term; and retrieving the pre-defined hierarchical structure based, at least in part, on the estimate of one or more categories, wherein the estimate of one or more categories includes at least one of the first category or the second category.

17. The system of claim 11, wherein the control circuitry is further configured to identify the first node by:

retrieving a plurality of textual subcategory names relating to the respective tag, wherein each textual subcategory name indicates a same subcategory as the respective tag;

determining whether a first subcategory corresponding to the first node matches any textual category name from the plurality of textual category names; and in response to determining that the first subcategory corresponding to the first node matches a textual category name from the plurality of textual category names, determining that the first subcategory corresponding to the first node matches the subcategory described by the tag.

18. The system of claim 11, wherein the control circuitry is further configured to determine a first path from the first seed node to the first node by traversing the pre-defined hierarchical structure from the first node to the first seed node and progressively including each edge that leads to a node at a next level.

19. The system of claim 18, wherein the control circuitry is further configured to compute the first distance based, at least in part, on a number of edges in the first path.

20. The system of claim 11, wherein the pre-defined hierarchical structure comprises a third seed node and a plurality of third lower-level nodes that are connected to the third seed node, and wherein the control circuitry is further configure to, for a particular tag of the plurality of tags:

determine that no node of the plurality of third lower-level nodes matches a subcategory corresponding to the particular tag; and in response to determining that no node of the plurality of third lower-level nodes matches the subcategory corresponding to the particular tag, allocate a pre-defined path length to denote a distance from the particular tag to the third seed node.

* * * * *